(12) United States Patent
Rosenberg et al.

(10) Patent No.: US 6,423,123 B1
(45) Date of Patent: Jul. 23, 2002

(54) FILTERING MATERIAL FOR FLUIDIC MEDIA AND A METHOD AND DEVICE FOR PRODUCING SUCH A FILTERING MATERIAL

(75) Inventors: Gerald Rosenberg, Höchstädt; Martina Robisch, Schwarzenbach/Saale; Uwe Krull, Bayreuth, all of (DE)

(73) Assignee: Helsa-Werke Helmut Sandler GmbH & Co. KG, Gefrees (DE)

( * ) Notice: Subject to any disclaimer, the term of this patent is extended or adjusted under 35 U.S.C. 154(b) by 0 days.

(21) Appl. No.: 09/806,391

(22) PCT Filed: Oct. 1, 1999

(86) PCT No.: PCT/DE99/03162

§ 371 (c)(1),
(2), (4) Date: Jun. 4, 2001

(87) PCT Pub. No.: WO00/20099

PCT Pub. Date: Apr. 13, 2000

(30) Foreign Application Priority Data

Oct. 2, 1998 (DE) .......................................... 198 45 526

(51) Int. Cl.[7] .......................... B01D 53/02; B01J 20/28
(52) U.S. Cl. .......................... 96/154; 210/506; 55/524; 55/527; 55/DIG. 5; 55/DIG. 42; 442/58; 442/417
(58) Field of Search .................... 210/502.1, 501, 210/506; 96/154, 135, 153; 95/285; 55/524, 527, DIG. 13, DIG. 5, DIG. 42; 442/58, 170–417

(56) References Cited

U.S. PATENT DOCUMENTS

| | | |
|---|---|---|
| 2,988,469 A | 6/1961 | Watson |
| 3,019,127 A | 1/1962 | Czerwonka et al. |
| 3,971,373 A | 7/1976 | Braun |
| 4,160,059 A | 7/1979 | Samejima |
| 4,215,682 A | 8/1980 | Kubik et al. |
| 4,342,811 A * | 8/1982 | Lopatin et al. .......... 210/502.1 |
| 4,433,024 A | 2/1984 | Eian |
| 4,784,892 A | 11/1988 | Storey et al. |
| 4,786,550 A * | 11/1988 | McFarland et al. ......... 442/118 |
| 4,797,318 A | 1/1989 | Brooker et al. |
| 4,877,679 A * | 10/1989 | Leatherman et al. ..... 428/315.5 |
| 4,917,942 A | 4/1990 | Winters |
| 4,948,639 A | 8/1990 | Brooker et al. |
| 5,124,177 A | 6/1992 | Kasmark, Jr. et al. |
| 5,328,758 A * | 7/1994 | Markell et al. ............. 428/281 |
| 5,486,410 A | 1/1996 | Groeger et al. |
| 5,516,569 A * | 5/1996 | Veith et al. ................. 428/156 |
| 5,603,753 A * | 2/1997 | Krull et al. ................... 96/121 |
| 5,616,169 A * | 4/1997 | de Ruiter et al. ....... 55/DIG. 42 |
| 5,720,832 A * | 2/1998 | Minto et al. ................ 156/62.4 |
| 5,952,092 A * | 9/1999 | Groeger et al. ............ 156/62.2 |

FOREIGN PATENT DOCUMENTS

| | | |
|---|---|---|
| DE | 25 02096 A1 | 8/1979 |
| DE | 3200959 A1 | 7/1983 |
| DE | 3813564 A1 | 11/1989 |
| DE | 3719415 C2 | 5/1991 |
| DE | 4034798 C2 | 7/1996 |
| EP | 0818 230 A1 | 1/1998 |
| GB | 2077141 A | 12/1981 |
| GB | 2194255 A | 3/1988 |
| WO | WO 97/39835 | 10/1997 |

* cited by examiner

Primary Examiner—David A. Simmons
Assistant Examiner—Frank M. Lawrence
(74) Attorney, Agent, or Firm—Hoffman & Baron, LLP

(57) ABSTRACT

There is described a filter material, in particular in the form of a flat article, for fluid media, comprising a carrier layer and an adsorption layer, wherein the adsorption layer is formed by melt adhesive threads loaded with adsorber particles. There is also described a process for producing a filter material of that kind.

41 Claims, 3 Drawing Sheets

FILTERING MATERIAL FOR FLUIDIC MEDIA AND A METHOD AND DEVICE FOR PRODUCING SUCH A FILTERING MATERIAL

This application is a 371 of PCT application No. PCT/DE99/03162, filed on Oct. 1, 1999.

BACKGROUND OF THE INVENTION

The present invention concerns a filter material, in particular in the form of a flat article, for fluid media, comprising a carrier layer and an adsorption layer, as well as a process and an apparatus for producing such a flat article. A particularly area of use for such adsorption filters is in particular use thereof in motor vehicles as a filter for the passenger compartment air. Other areas of use are for example use in relation to the production of protective clothing and insoles or the use as exhaust air or ventilation filters in the domestic section.

A series of various adsorption filters and processes for the production thereof are known from the state of the art. These adsorption filters which are known from the state of the art can be basically subdivided into those in which adsorber particles are arranged within a fleece or non-woven cloth or fiber or foam layer and those in which adsorber particles are arranged on a layer of a particle filter or between two such layers.

DE 37 19 415 A1 discloses for example a filter element with an open-pore foam carrier and adsorber particles. Apart from the complicated and expensive manner of manufacture involved here, a filter element of that kind suffers from the disadvantage that the amount of adsorber which can be applied and thus the capacity is restricted by the pore size of the foam carrier. A higher weight in relation to surface area of the filter can only be achieved by way of a greater thickness for the foam matrix, which results in worsened air permeability, that is to say an increased pressure drop at the filter. Uniform introduction of the adsorber particles also represents a certain problem, in which respect DE 37 19 415 A1 also discloses the use of binding agents for the immobilization of the adsorber particles. A further great disadvantage of filters of the described kind is that pleating which is imperative in the production of combination filters is only possible with difficulty by virtue of the thickness of the foams used.

German published specification (DE-AS) No 25 02 096 discloses an adsorption filter, in the production of which adsorber particles are introduced into the fleece or non-woven cloth during the operation of laying same, and are held exclusively mechanically, that is to say without binding agent or adhesive, between the intersection points of the fibers used for production of the non-woven cloth. Adsorption filters produced in that way however suffer from a series of disadvantages. On the one hand, the non-woven cloth must involve a certain minimum density in order substantially to prevent the adsorber particles from falling out, in which respect it is not possible entirely to prevent adsorber particles from falling out when a mechanical loading is involved, for example due to vibration, or, when used to produce protective clothing, when the clothing is being worn. In particular the required thickness of the non-woven cloth gives rise to a pressure drop at the filter which as far as possible is to be avoided.

German published specification (DE-AS) No 125 41 27 discloses a filter layer in which adsorber particles are fixed in the non-woven cloth or fleece by a suitable binding agent which can possibly be hardened. For that purpose a suitable web of non-woven cloth is sprayed with a binding agent and subsequently the adsorber particles are applied to the non-woven cloth and distributed in the layer of non-woven cloth by the action of a vibrating sieve. A disadvantage in that respect is that uniform distribution of the adsorber particles within the layer of non-woven cloth can only be achieved at the cost of high effort and expenditure, if at all, because the adsorber particles which first impinge on the non-woven cloth provided with the binding agent immediately adhere to the non-woven cloth fibers and at least greatly prevent further penetration of adsorber particles into the non-woven cloth. It is also not impossible that the adsorption capability of a filter of that kind is comparatively severely restricted because a large part of the surface of the adsorber particles is wetted with binding agent and is thus no longer available for adsorption.

A similar filter to that described above is known from U.S. Pat. No. 5, 124,5, 177. In production of the filter in accordance with U.S. Pat. No. 5, 124, 177, a web of non-woven cloth is firstly sprayed with a binding agent and then adsorber particles are applied to the non-woven cloth and mechanically incorporated thereinto. Optionally, thereafter the procedure involves a further spray coating operation using a binding agent. Accordingly that filter suffers from the same disadvantages as that described hereinbefore, but in this case the adsorption capability is further reduced in the operating procedure which involves a second application of binding agent. Furthermore, in comparison with the mass of adsorber particles, a large amount of binding agent is required for durably fixing the adsorber particles.

A flat textile filter with adsorption properties, which does not include additional binding agent of the kind set forth hereinbefore, is the subject-matter of DE 32 00 959 A1. In that filter, adsorber particles are introduced into a non-woven cloth which contains fibers which at elevated temperature become temporarily sticky without melting. The fibers of that kind, which are disclosed in that respect, are heterophilic fibers comprising two coaxially arranged components of which the outer has a lower melting point, and undrawn amorphous polyester fibers. In the production of that filter, firstly a non-woven cloth is formed from the appropriate fibers, then the adsorber particles are incorporated into the non-woven cloth, and finally the adsorber particles are fixed to the fibers by heating the non-woven cloth and subsequently cooling it. A disadvantage in that respect is both the expensive production of the filter and also the comparatively high degree of wetting of the surface of the adsorber particles at the contact locations with the fixing fibers, with an adsorber particle generally being fixed to a plurality of fibers. In addition the binding fibers used are comparatively costly.

Finally the state of the art also includes GB 2 077 141 A, DE 38 13 564 A1, DE 40 34 798 C2 and EP 0 818 230 A1 which each relate to filters with adsorption properties in which at least one layer of adsorber particles is fixed on the surface of a substrate, for example a non-woven cloth, with a binding agent. Those filters suffer in particular from the disadvantage that a relatively large amount of binding agent is required, while at the same time the adsorption capacity leaves something to be desired by virtue of wetting of the surface of the adsorber particles with the respective binding agent. In terms of practical use moreover the provision of a further layer of a non-woven cloth material is generally required so that adsorber particles do not come loose from the substrate when a mechanical loading is involved.

In consideration of the filter materials known from the state of the art, with adsorption properties, and the disadvantages that they entail, there is still a need for an improved filter material which as far as possible eliminates the disadvantages known from the state of the art and which is economical to produce. The provision of a flat article of that kind, for example for use as a filter, a process for the production thereof and an apparatus for carrying out that process are therefore the object of the present invention.

SUMMARY OF THE INVENTION

That object is attained by a filter material of the kind described in the opening part of this specification, in that the adsorption layer is formed by melt adhesive threads loaded with adsorber particles.

DETAILED DESCRIPTION OF THE INVENTION

The filter according to the invention is distinguished in particular by a high level of adsorption capacity, spontaneity and a high level of air permeability. That is due to the fact that the adsorber particles are fixed to the melt adhesive threads, in respect of an extremely small surface area. The adsorber particles are also distributed at irregular spacings along the fiber around the entire periphery thereof. As the adsorption layer is also formed exclusively from those melt adhesive threads which are loaded with adsorber particles and which adhere to the carrier layer, there is no need for further fixing of the adsorption layer to the carrier layer by means of a binding agent or by needling. The adsorber particles are preferably formed by silicates, zeolites and/or particularly preferably by activated carbon, which can be impregnated with generally known substances to impart particular adsorption properties.

Due to the firm adhesion of the adsorber particles to the melt adhesive threads, with the configuration according to the invention of the adsorption layer in the form of a wide-mesh irregularly three-dimensional network, there is also no risk of adsorber particles coming loose from the adsorption layer. At the same time, this configuration of the adsorption layer permits a high level of air permeability with a high degree of adsorption capacity and high spontaneity.

In principle all materials which are common in the present sector can be used as the carrier layer, in which respect a spun bond material on a polyester, polyolefin, polycarbonate, polyurethane or polyamide base or of crosslinked PUR-foam is preferred. Materials on a polyester, polyolefin, polycarbonate, polyurethane or polyamide base are also preferred as the melt adhesive, while the melt adhesive threads of the adsorption layer in the filter according to the invention are particularly preferably in a relationship of polymer unity with the carrier layer because that permits particularly simple and inexpensive recycling of the filter.

The amount of adsorber particles which are contained in the adsorber layer can be up to 3500 g/m$^2$, preferably between 300 and 1500 g/m$^2$.

For certain purposes of use in which the filter is for example subjected to a particularly high level of mechanical loading, it is preferable to provide a cover layer on the side of the adsorber layer, which is remote from the carrier layer. That cover layer then comprises a non-woven cloth, laid material, woven material, or knitted material and is particularly preferably made from a material which is in a relationship of polymer unity with the material of the carrier layer and/or the melt adhesive or the melt adhesive threads.

The adsorber particles are generally of spherical and/or irregular, that is to say any, shape, and are of a diameter in the range of between 0.05 and 2 mm. The high adsorption capacity of the filter is further achieved by virtue of the fact that the diameter of the adsorber particles is in the range of between 0.05 and 2 mm, thereby affording an advantageous relationship between the adsorbent surface area and the mass of the adsorber particles.

The melt adhesive threads comprise a melt adhesive which advantageously has a softening range of between 75 and 200° C. in particular between 100 and 150° C. Temperatures of that kind can be easily achieved in the processing procedure, with a low level of energy input. As the temperature resistance of the filter according to the invention is limited by its softening temperature, the use of a post-cross-linking melt adhesive is possible if the filter is to be used in an environment with a correspondingly increased temperature.

In accordance with the invention the melt adhesive threads are of a diameter which is smaller at least by the factor 10 than the diameter of the adsorber particles. That affords the advantage that the melt adhesive threads are in fact in contact with the adsorber particles only with an extremely slight spatial extent. In addition this permits a particularly low proportion of melt adhesive in the filter according to the invention, which is advantageously between 2 and 10% by weight, in particular between 2.5 and 5% by weight, so that the adsorption layer substantially comprises adsorber particles which are arranged three-dimensionally in space and the surfaces of which are for by far the greatest part freely accessible to the medium flowing through the filter. As a result the filter material has very good kinetic properties.

In a particular configuration the material of the carrier layer comprises a hot adhesive mesh or non-woven cloth. In that way for example the side of the carrier layer, which is remote from the adsorber layer, can be secured in point form or in respect of small surface areas thereof, to other articles such as for example filter frames, grids or the like.

Arranging a further filtering layer portion on the adsorber layer also affords the possibility of providing the filter according to the invention with further filter properties such as for example by means of a particle filter. It will be appreciated that independently thereof the carrier layer can also have filtering properties.

The object of the present invention is further attained by a process for producing the above-described filter, in which at least one melt adhesive thread is spun from at least one nozzle in the direction of a carrier non-woven cloth guided at a spacing along the at least one nozzle, wherein loading of the at least one melt adhesive thread with adsorber particles is effected in the region of the portion between the nozzle and the carrier non-woven cloth and said at least one melt adhesive thread loaded with adsorber particles subsequently impinges on the carrier non-woven cloth and adheres place-wise thereto.

In the process according to the invention the at least one melt adhesive thread is spun out under pressure through an individual nozzle or an individual gap which can be arranged individually, in series or randomly on a spinning head. It is preferred in that respect if the operation of spraying on the melt adhesive thread is effected over a width which corresponds to that of the carrier layer. Typically, before the spraying operation the melt adhesive is heated to a temperature of between 20 and 50° C. above its melting temperature (or softening point) and sprayed by means of hot compressed air at the same temperature. The hot compressed air acts on the melt adhesive with a pressure, for example, in the range of between 2 and 5 bars. In order to refine the fiber spray air in the form of at least one air flow is supplied around the fiber outlet or laterally. That causes the fiber to be drawn or stretched. In accordance with the invention, adsorber particles are fed to the fiber or fibers produced in that way, which are still sticky at a certain distance relative to the outlet location from the at least one nozzle, and those particles remain adhering to the fiber or fibers. The feed of the adsorber particles is preferably effected by way of a shaker or vibrator device, wherein the secondary air produced for drawing the fiber exerts a jet effect and has the result that the adsorber particles which trickle in that jet flow remain adhering along the sprayed melt adhesive thread or threads.

The melt adhesive threads loaded with adsorber particles now impinge on the carrier layer which is moved therepast and in that situation are deposited on an air cushion produced by the primary air on the flat article, in which case unoccupied fiber locations automatically produce a join to the carrier, that is to say adhere to the carrier. The air cushion formed from the primary air also ensures that an excessively close bond between fibers and adsorbers does not occur. Rather, the adsorber particles are suspended in a kind of loose, three-dimensional fiber network or mesh.

So that deposit of the adsorber particle-loaded melt adhesive threads takes place as uniformly as possible, the procedure preferably involves the use of a slit nozzle which desirably covers over the entire width of the carrier layer. The primary and secondary air used in the fiber spraying operation is however troublesome in terms of a uniform deposit of the melt adhesive threads. It is therefore preferable for the carrier layer to be guided at the deposit location in the form of a convexly curved web because in that way the afflux air is guided away and only minimum turbulence is formed, if at all, in the deposit region. Rollers which are adjustable in respect of their height and possibly laterally are used for guiding the carrier layer in a particularly advantageous manner, as this is simple and variable to implement, such rollers permitting simple adaptation of the geometry of the configuration of the web of carrier layer material. The above-described measures permit uniform application of the adsorber layer on the carrier layer and calendering of the filter element can be omitted, thereby by retaining the advantageous, loose, three-dimensional structure.

It is also particularly advantageous that the process according to the invention makes it possible to freely adjust the amount of adsorber which can be applied as well as the adsorber layer thickness. It is possible without any problem for example to apply an amount of adsorber per application device of up to 3500 g/m$^2$, in which respect it is possible at the same time to produce small layer thicknesses of to at least 1.5 mm which can otherwise only be achieved by calendering, with the application of a comparable amount of adsorber.

Excess non-fixed adsorber particles can be sucked away at points which do not influence the flow conditions of the air at the place of deposit, so that there is no particle emission into the ambient atmosphere. Encapsulation of the apparatus or a part of the apparatus can further be provided in order to afford still better protection in regard to the fluidic conditions at the place of deposit and for reliably avoiding particle emissions into the ambient atmosphere.

By virtue of the uniform deposit the process according to the invention further permits production speeds of up to 50 m/min, with a usual degree of coating of the adsorber layer of 500 g/m$^2$. The adsorber layer can be coated or lined in a subsequent operating step, that is to say also in an "online procedure", with a cover layer, for example a fiber non-woven cloth. In this case also the existing free locations of the melt adhesive threads are sufficient to bind the material. A further considerable advantage of the filter produced in that way is that it can be cut to size, pleated or rolled up without any problem and can be put to use in many sectors. The production process according to the invention is thus found to be very efficient, high-quality and extremely economical.

The object set forth in the opening part of this specification is finally further attained by an apparatus for carrying out the above-described process, in that a spray head with at least one nozzle is arranged at a spacing a from the path of a web of a carrier non-woven cloth and at an angle a relative to the vertical (drawing), the apparatus further has a feed device for particulate material and a transport device for a carrier nonwoven cloth, and that the outlet location of the feed device is positioned at a distance of between 1 and 5 cm from the spray head.

The apparatus according to the invention permits particularly simple production of the filter according to the invention, with measures which involve a small amount of structure. It is preferred in that respect if the angle $\alpha$ of the spray head is between 20 and 45°, in particular between 20 and 35°, because that permits fixing of the adsorber particles to the issuing melt adhesive threads, without excessive adsorber particles impinging on the carrier layer at the deposit location and possibly remaining loosely in the adsorber layer. In this case the apparatus according to the invention can also be of such a configuration that there is no carrier layer web disposed perpendicularly beneath the outlet opening of the feed device for the adsorber particles. It will be appreciated however that it is also possible for impingement of excess adsorber particles on the carrier layer to be implemented in front of the deposit location, for example by virtue of the provision of a deflector plate in combination with a suction removal device or exclusively by means of a sufficiently effective suction removal device.

In a particular embodiment of the apparatus according to the invention it has a deposit location for the melt adhesive thread or threads loaded with adsorber particles, at which location the carrier non-woven cloth passes on its transportation path of movement through the shortest distance in relation to the spray head, in which respect that distance, that is to say the spacing a, is between 5 and 20 cm, in particular between 8 and 12 cm, because the melt adhesive threads on impinging on the carrier layer still have an adhesion capability which is sufficient for adhering thereto. In order to permit as uniform deposit as possible of the melt adhesive threads loaded with adsorber particles, the deposit location preferably involves a convexly curved geometry, this being formed in particular by a roller which is part of the transport device.

Figure 1:
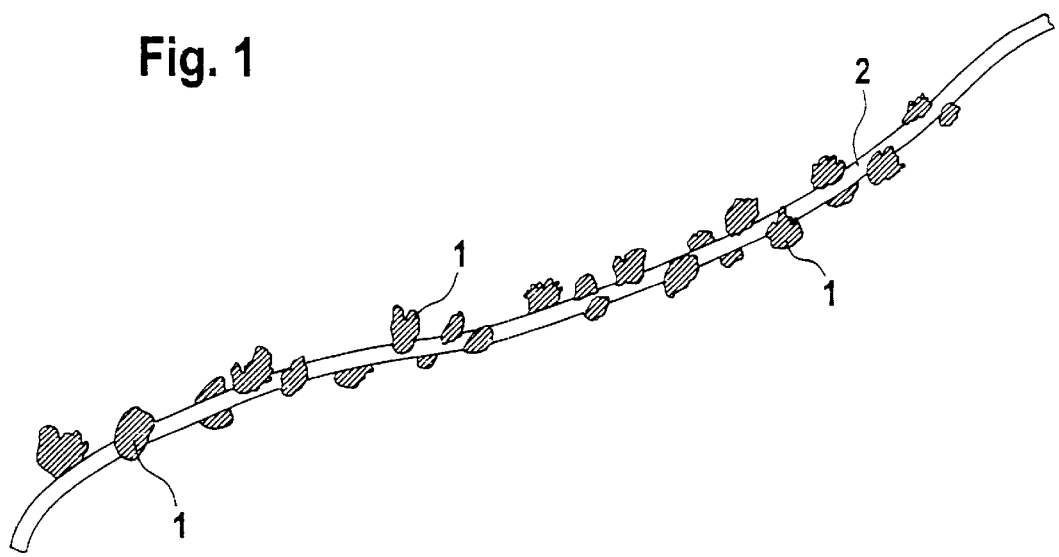
FIG. 1 is a diagrammatic view of a melt adhesive thread loaded with adsorber particles, as is contained in the filter according to the invention.

With reference to the accompanying drawings, the invention will now be described in greater detail in the form of embodiments given by way of example:

FIG. 1 diagrammatically shows a portion of a melt adhesive thread 2 which is loaded with adsorber particles 1. The view is greatly simplified and is distinguished in particular by virtue of showing the melt adhesive thread on a greatly enlarged scale.

Figure 2:
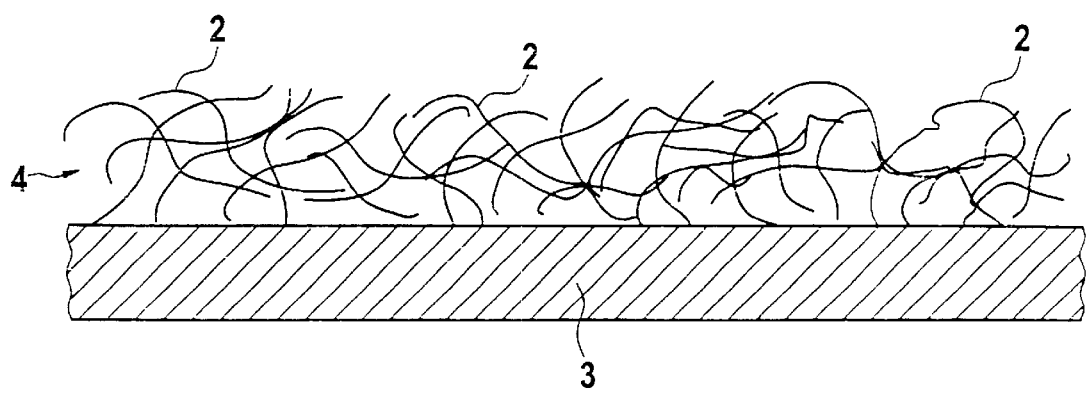
FIG. 2 is a diagrammatic view of a cross-section of the filter according to the invention.

FIG. 2 is a diagrammatic and greatly simplified view of once again a portion of the filter according to the invention. The melt adhesive threads 2 loaded with adsorber particles are in this case arranged in the form of a wide-mesh, irregular, three-dimensional net or lattice on a carrier layer and overall form the adsorption layer 4.

Figure 3:
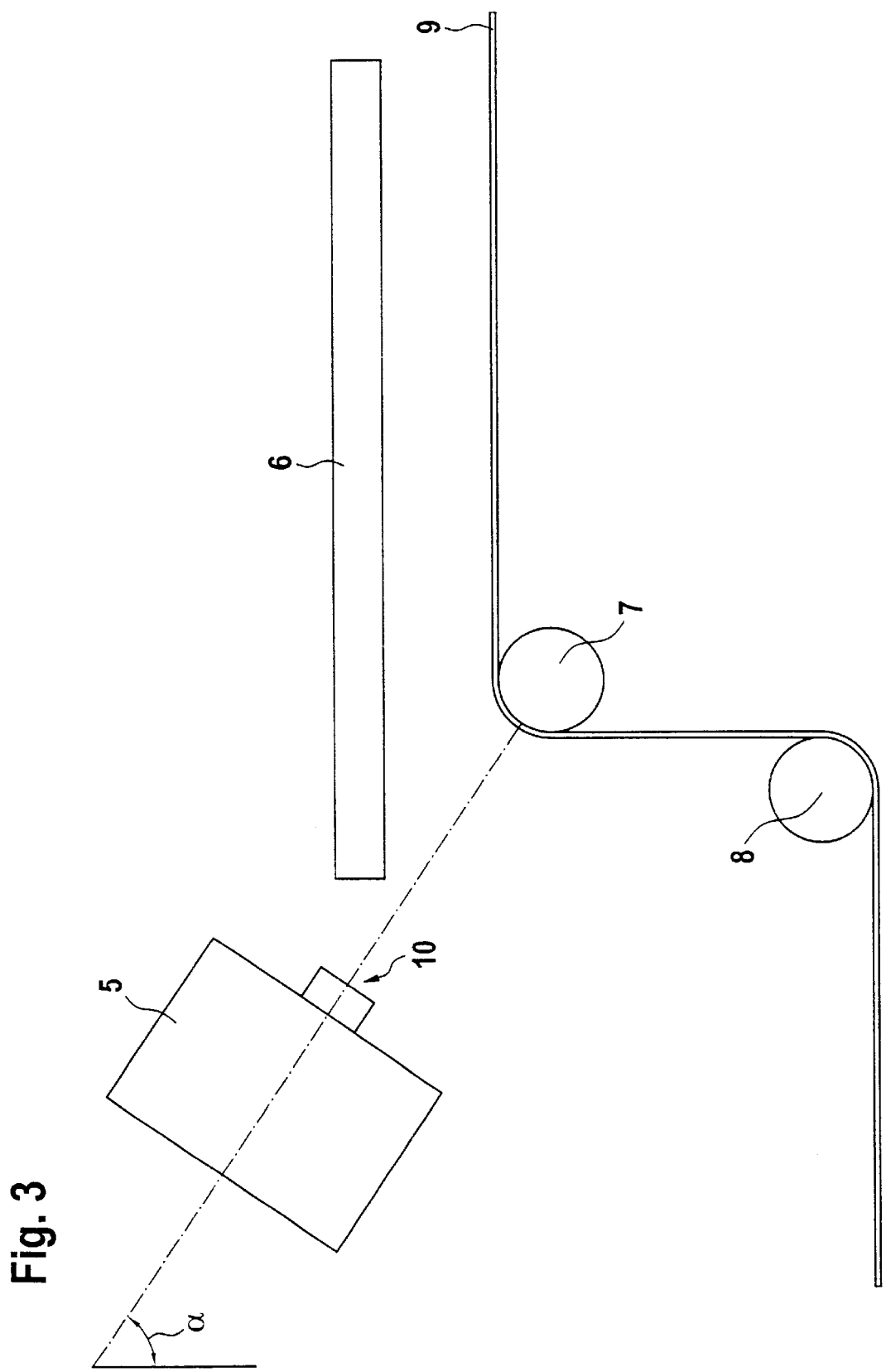
FIG. 3 is a diagrammatic view of the apparatus according to the invention for producing the filter according to the invention.

FIG. 3 is an also greatly simplified view of the apparatus according to the invention for production of the non-woven cloth according to the invention. The illustration shows in particular the spray head 5, the feed device for particulate material 6, the transport device formed by rollers 7, 8 and the carrier non-woven cloth web 9. In this case the spray head 5 is arranged at an angle a relative to the perpendicular, in the present Figure being 45°. Melt adhesive threads are extruded from the outlet opening 10 of the spray head 5 under pressure in a direction towards the carrier non-woven cloth web 9 which is passing over the roller 7. The melt adhesive can be sprayed on at a rate of between 100 and 200 g/min, in particular at a rate of between 125 and 175 g/min. These melt adhesive threads are subjected to post-stretching by an air flow (not shown) directed onto the roller 7 (jet effect). At the same time adsorber particles issue at the side, which is directed to the spray head, of the feed device for particulate material 6, the particles falling downwardly due to the effect of the force of gravity and in regard to part thereof impinging directly onto the sticky melt adhesive threads and in regard to the other part thereof passing into the secondary air flow and being distributed along the fiber.

At the position of the roller 7 the carrier non-woven cloth web passes in a convexly curved path and at that location the melt adhesive threads 2 which are loaded with adsorber particles impinge on the carrier non-woven cloth web and remain adhering thereto. If the feed device for particulate material 6 is formed by a vibrator device or an oscillating element, the ejection edge which is directed towards the spray head is disposed at a radius of between 3 and 10 cm away from the outlet opening 10 of the spray head and can be freely adjusted in terms of positioning, oscillation frequency and oscillation amplitude, whereby the amount of adsorber particles which is to be metered out is regulated. An oscillating element of that kind is filled with adsorber particles from a supply container (not shown), in which respect the amount which is put onto the oscillating element can be regulated by way of the size of the outlet slot of the container.

Figure 4:
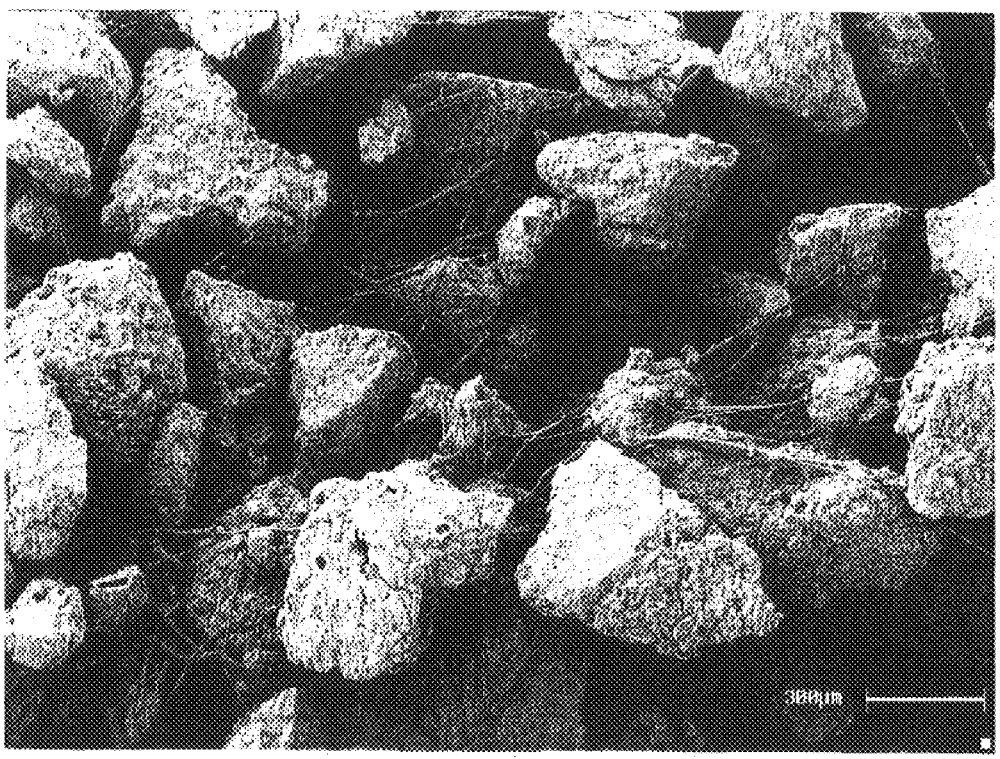
FIG. 4 shows a scanning electron microscope recording of the adsorber layer of the filter material according to the invention.

FIG. 4 shows a scanning electron microscope recording of the adsorber layer of the filter material according to the invention, from which it is readily possible to see the melt adhesive threads and the adsorber particles, as well as the fact that the adsorber particle which is irregularly shaped in the present recording is free of melt adhesive and is thus available for adsorption purposes.

EXAMPLE

In a conventional thermoplastic melting apparatus, a melt adhesive based on polyolefins is heated to between 180 and 190° C. The molten thermoplastic material is fed to a wide-slit nozzle from which it is extruded in a width of 25 cm with compressed air at a temperature of between 180 and 190° C., at between 2.5 and 3.0 bars, at a rate of 150 g/min. In this situation the primary air divides up the molten polyolefin mix into thermoplastic threads of a diameter of about 10 $\mu$m.

About 2 cm downstream of the outlet slot of the nozzle, an activated carbon granular material of 30 ×70 mesh is metered out at a delivery rate of 5 kg/min by way of a regulatable oscillating element. By virtue of their weight, the activated carbon particles which are thus attracted onto the thermoplastic material tear the thermoplastic threads into pieces. The fibers loaded with the activated carbon particles are deposited on an air-permeable spun bond carrier non-woven cloth which is guided along beneath the nozzle at a speed of 20 m/min.

The spun bond carrier non-woven cloth is supplied in steps by way of a 2-roller system so that the inclinedly extruded thermoplastic threads impinge on the carrier non-woven cloth approximately at a right angle. In the illustrated embodiment the inclination of the spray head is 30°.

The product manufactured with this process comprises an air-permeable spun bond carrier non-woven cloth. Sprayed thereonto is an irregular, wide-mesh net comprising thermoplastic polyolefins in thread form, to which activated carbon particles are attracted in a form similar to a chain of pearls. The activated carbon granular material used is of a grain size of 30×70 mesh. The amount of activated carbon applied in the present specific embodiment is about 800 g/m$^2$ with a proportion of polyolefin of about 35 g/m$^2$. The overall filter material is of a weight in relation to surface area of 905 g/m$^2$+20 g/m$^2$. The flat article produced in accordance with the foregoing process achieves a thickness of 2.5 mm+0.3 mm. The flat filter material has a pressure drop of 180 Pa+20 Pa with a volume flow of 1.35 m/s.

What is claimed is:

1. A filter material for fluid media, comprising a carrier layer (3) and an adsorption layer (4) wherein the adsorption layer (4) is formed by melt adhesive threads (2) loaded with adsorber particles (1) and wherein the melt adhesive proportion is between 2 and 10% by weight of the mass of the adsorption layer (4) and the carrier layer (3) and the filter material further contains between 300 g/m$^2$ and 3500 g/m$^2$ of adsorber particles.

2. A filter material as set forth in claim 1 characterized in that the adsorber particles (1) are formed by silicates, zeolites or activated carbon.

3. A filter material as set forth in claim 1 wherein the melt adhesive threads (2) loaded with adsorber particles (1) adhere over a small surface area to the carrier layer (3).

4. A filter material as set forth in claim 1 wherein the melt adhesive threads (2) loaded with adsorber particles (1) form a wide-mesh, irregular, three-dimensional netting.

5. A filter material as set forth in claim 1 wherein the carrier layer comprises a non-woven cloth, a laid material, a woven material or a knitted material.

6. A filter material as set forth in claim 1 wherein the carrier layer (3) is formed from a non-woven cloth on a polyester, polyoelfin, polycarbonate, polyurethane or polyamide base or cross-linked PUR-foam.

7. A filter material as set forth in claim 1 wherein the melt adhesive comprises a material on a polyester, polyolefin, polycarbonate, polyurethane or polyamide base, wherein the melt adhesive is in a relationship of polymer unity with the carrier layer (3).

8. A filter material as set forth in claim 1 wherein the melt adhesive is a reactive, cold-cross-linking melt adhesive.

9. A filter material as set forth in claim 1 wherein the adsorber particles (1) are contained in the adsorber layer (4) in an amount of up to 3500 g/m$^2$.

10. A filter material as set forth in claim 1 wherein the adsorber layer (4) is provided with a cover layer on the side remote from the carrier layer (3).

11. A filter material as set forth in claim 10 wherein the cover layer comprises a non-woven cloth, a laid material, a woven material or a knitted material.

12. A filter material as set forth in claim 10 wherein the material of the carrier layer is in a relationship of polymer unity with the material of the carrier layer or the melt adhesive.

13. A filter material as set forth in claim 10 wherein the adsorber particles (1) are of spherical or irregular shape and are of a diameter in the range of between 0.05 and 2 mm.

14. A filter material as set forth in claim 10 wherein the melt adhesive has a melting temperature of between 75 and 200° C.

15. A filter material as set forth in claim 10 wherein the diameter of the melt adhesive threads (2) is smaller at least by a factor of 10 than the diameter of the adsorber particles (1).

16. A filter material as set forth in claim 10 wherein the carrier material comprises a hot adhesive net or non-woven cloth.

17. A filter material as set forth in claim 10 wherein a further filter layer portion is arranged on the adsorber layer (4).

18. A process for producing a filter material as set forth in claim 10 comprising spraying at least one melt adhesive thread from at least one nozzle in the direction of a carrier non-woven cloth which is guided at a spacing along the at least one nozzle, wherein loading of the at least one melt adhesive thread with adsorber particles is effected in the region of the portion between the nozzle and the carrier non-woven cloth, and said at least one melt adhesive thread loaded with adsorber particles subsequently impinges onto the carrier nonwoven cloth and adheres thereto over a small area.

19. A process as set forth in claim 18 wherein the operation of spraying the melt adhesive threads is effected over a width which corresponds to that of the carrier layer.

20. A process as set forth in claim 18 wherein the melt adhesive is extruded under pressure out of an individual or slit nozzle, and wherein at least one air flow for stretching the at least one fiber is supplied around the melt adhesive outlet or laterally thereof.

21. A process as set forth in claim 18 wherein the feed of the adsorber particles is effected by way of a vibrator device.

22. A process as set forth in claim 18 wherein the carrier non-woven cloth is guided on a convexly curved path in the region of impingement of the at least one melt adhesive thread loaded with adsorber particles.

23. A process as set forth in claim 18 wherein before the spraying operation the melt adhesive is heated to a temperature of between 20 and 50° C above its melting temperature and sprayed by means of hot compressed air at the same temperature.

24. A process as set forth in claim 23 wherein the hot compressed air acts on the melt adhesive with a pressure in the range of between 2 and 5 bars.

25. A process as set forth in claim 18 wherein the melt adhesive is sprayed on at a rate of between 100 and 200 g/min.

26. Apparatus for carrying out the process as set forth in claim 18 comprising a spray head (5) with at least one nozzle is arranged at a spacing from the path of a carrier non-woven cloth web (9) and at an angle a relative to the vertical, the apparatus further has a feed device (6) for particulate material and a transport device for a carrier non-woven cloth, and that the outlet location of the feed device is positioned at a distance of between 1 and 5 cm from the spray head (5).

27. Apparatus as set forth in claim 26, characterized in that the angle $\alpha$ is between 20 and 45°.

28. Apparatus as set forth in claim 27 characterized in that the angle $\alpha$ is between 25 and 35°.

29. Apparatus as set forth in claim 26 wherein the apparatus has a deposit location for the melt adhesive threads loaded with adsorber particles, at which location the carrier non-woven cloth passes in its transportation path through the shortest distance relative to the spray head (5), and said distance is between 5 and 20 cm.

30. Apparatus as set forth in claim 26 wherein the deposit location involves a convexly curved geometry and is formed by a roller (7) which is part of the transport device.

31. Apparatus as set forth in claim 26 wherein the at least one nozzle is formed by a single slit nozzle which corresponds in respect of its width to the width of the carrier non-woven cloth.

32. Apparatus as set forth in claim 26 wherein one or more air outlet nozzles are arranged around the at least one nozzle or laterally thereof.

33. Apparatus as set forth in claim 26 wherein the feed device (6) is formed by a vibrator device.

34. Apparatus as set forth in claim 26 wherein there is provided a suction removal device for excess particles.

35. A filter comprising a filter material as set forth in claim 1.

36. A filter material as set forth in claim 8 wherein the melt adhesive is a reactive, cold-cross-linking melt adhesive on a polyurethane base.

37. A filter material as set forth in claim 9 wherein the adsorber particles (1) are contained in the adsorber layer (1) in an amount in the range of between 300 and 1500 g/m².

38. A filter material as set forth in claim 14 wherein the melt adhesive has a softening range of between 100 and 150° C.

39. A filter material as set forth in claim 10 wherein the melt adhesive/adsorber ratio is between 2.5 and 5% by weight.

40. A process as set forth in claim 25 wherein the melt adhesive is sprayed on at a rate of between 125 and 175 g/min.

41. Apparatus as set forth in claim 28 wherein said distance is between 8 and 12 cm.

* * * * *

UNITED STATES PATENT AND TRADEMARK OFFICE
CERTIFICATE OF CORRECTION

PATENT NO. : 6,423,123 B1
DATED : July 23, 2002
INVENTOR(S) : Rosenberg et al.

It is certified that error appears in the above-identified patent and that said Letters Patent is hereby corrected as shown below:

Column 10,
Line 7, now reads "at an angle a relative" should read -- at an angle $\alpha$ relative --
Line 44, now reads "adsorber particles (1) are" should read -- adsorber particles (4) are --.

Signed and Sealed this

Eleventh Day of March, 2003

JAMES E. ROGAN
*Director of the United States Patent and Trademark Office*